United States Patent
Callegari et al.

(10) Patent No.: US 6,583,847 B2
(45) Date of Patent: Jun. 24, 2003

(54) SELF ALIGNMENT OF SUBSTRATES BY MAGNETIC ALIGNMENT

(75) Inventors: Alessandro C. Callegari, Yorktown Heights, NY (US); Praveen Chaudhari, Briarcliff Manor, NY (US); James P. Doyle, Bronx, NY (US); Eileen A. Galligan, Fishkill, NY (US); James A. Lacey, Mahopac, NY (US); Shui-Chih Alan Lien, Briarcliff Manor, NY (US); Sampath Purushothaman, Yorktown Heights, NY (US); John J. Ritsko, Mt. Kisco, NY (US); James J. Speidell, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/883,578

(22) Filed: Jun. 18, 2001

(65) Prior Publication Data

US 2002/0191143 A1 Dec. 19, 2002

(51) Int. Cl.[7] .................. G02F 1/1333; G02F 1/13; G02F 1/1337
(52) U.S. Cl. ................... 349/158; 349/187; 349/191
(58) Field of Search ................. 349/158, 190–192, 349/149, 187, 153; 438/108

(56) References Cited

U.S. PATENT DOCUMENTS

| | | | | |
|---|---|---|---|---|
| 3,719,981 A | * | 3/1973 | Steitz | ................... 438/616 |
| 4,640,583 A | * | 2/1987 | Hoshikawa et al. | ......... 349/153 |
| 5,284,796 A | * | 2/1994 | Nakanishi et al. | .......... 438/108 |
| 5,519,524 A | * | 5/1996 | Fergason et al. | ............ 349/149 |
| 5,611,481 A | * | 3/1997 | Akamatsu et al. | .......... 228/180 |
| 5,770,826 A | | 6/1998 | Chaudhari et al. | |
| 6,020,946 A | | 2/2000 | Callegari et al. | |
| 6,061,114 A | | 5/2000 | Callegari et al. | |
| 6,104,466 A | * | 8/2000 | Buchwater et al. | ......... 349/187 |
| 6,124,914 A | | 9/2000 | Chaudhari et al. | |
| 6,136,047 A | * | 10/2000 | Karasawa et al. | ......... 29/25.01 |
| 6,179,679 B1 | | 1/2001 | von Gutfeld et al. | |
| 6,195,146 B1 | | 2/2001 | Chaudhari et al. | |

FOREIGN PATENT DOCUMENTS

JP        11-202350        *   7/1999

* cited by examiner

*Primary Examiner*—Julie Ngo
(74) *Attorney, Agent, or Firm*—Michael J. Buchenhorner; Casey P. August

(57) ABSTRACT

It is important to accurately align a pair of substrates, such as liquid crystal display (LCD) panels before they are affixed together. This is accomplished, according to the invention, by depositing a number of magnetic field generating elements on one substrate and a plurality of magnetic field-detecting elements on the other substrate. For example, the field-generating elements can be permanent magnets, while the field-detecting can be correspondingly located elements of a magnetic material. Alternatively, both the field-generating and field-detecting elements may be made from permanently magnetic materials.

6 Claims, 1 Drawing Sheet

SELF ALIGNMENT OF SUBSTRATES BY MAGNETIC ALIGNMENT

FIELD OF THE INVENTION

The present invention relates to the alignment of substrates, such as liquid crystal display (LCD) panels used to form computer displays and the like.

BACKGROUND OF THE INVENTION

In a number of industrial processes, it is necessary to accurately and simply align a pair of substrates before they are affixed together to prevent subsequent relative movement.

For example, the last four major steps of assembly of Liquid Crystal Display (LCD) panels comprises, printing a polyimide film including baking, rubbing to form an alignment layer, alignment of the two plates and sealing most of the periphery between the two plates, and filling with liquid crystal and sealing the last area of the periphery. In the third stage, the two panels have to be aligned precisely so that the Color Filter (CF) and the Thin Film Transistor (TFT) overlay within the required tolerances. This alignment is currently done before the liquid crystal is filled and before the two plates are glued together. This process requires moving the plates in and out of vacuum chambers. It is a tedious process that is machine intensive, space consuming, and relatively expensive. However, it is and has been the method of manufacturing liquid crystal displays for many decades. There have been many attempts to modify this process but so far only minor changes have been possible.

It is an object of the present invention to replace these four stages by a new process that takes much less space, less capital expense, and cheaper to manufacture. It is a further object of the invention that the new process also requires no removal from and to vacuum chambers. once in a vacuum chamber, the entire assembly is done with the help of robots.

Elements of this process are disclosed in U.S. Pat. No. 5,770,826, issued Jun. 23, 1998, to Chaudhari et al.; U.S. Pat. No. 6,124,914, issued Sep. 26, 2000, to Chaudhari et al; U.S. Pat. No. 6,020,946, issued Feb. 1, 2000, to Callegari et al.; U.S. Pat. No. 6,061,114, issued May 9, 2000, to Callegari et al; and U.S. Pat. No. 6,195,146, issued Feb. 27, 2001 to Chaudhari et al. The first two patents show how the rubbing machine and process associated with it can be replaced by a simple atomic beam alignment mechanism and the second two patents disclose how to replace the polyimide printing and curing by a dry vapor deposited film in a vacuum chamber without breaking vacuum.

It is known in the art that LCD can be filled by the so called "one drop fill" ("ODF") method (see U.S. Pat. No. 6,179,679, issued Jan. 30, 2001 to von Gutfeld et al). In this ODF technique, instead of sucking the liquid crystal into the display by evacuating the air between the two plates and then allowing the liquid crystal to be sucked back into the empty space, a requisite number of drops are placed between the two plates in a vacuum chamber and then the two plates are placed together to spread the liquid uniformly. After this filling, the plates are aligned and sealed. The alignment of these plates is done mechanically. This is possible for passive matrix displays since the alignment is not as demanding as that required by high resolution active matrix displays that are the most popular kind of displays for personal computers and monitors.

SUMMARY OF THE INVENTION

The present invention broadly provides a method of aligning a pair of substrates during assembly thereof, the aforesaid method comprising the steps of, a) depositing at least one field-generating element at a selected locations on a first surface of a first substrate, b) depositing a corresponding field-detecting element at a correspondingly selected location on a second surface of a second substrate, c) then joining the substrates together into approximate alignment of the first substrate with the second substrate to permit a field interaction between a corresponding field-generating element and a corresponding field-detecting element to act to complete alignment between the first substrate and the second substrate.

While a single pair of field-generating and field-detecting elements may be used, it is preferable to utilize a plurality of field-generating elements at selected locations on said first surface and a corresponding plurality of field-detecting elements disposed at correspondingly selected locations on said second surface of said second substrate.

According to a preferred embodiment of the invention, for LCD assembly, the invention provides a method of aligning a pair of substrates during assembly of a liquid crystal display panel comprising the steps of, a) depositing a plurality of field-generating elements at selected locations on a first surface of a first substrate, b) depositing a corresponding plurality of field-detecting elements at correspondingly selected locations on a second surface of a second substrate, c) depositing a selected quantity of liquid crystal material in a central region of one of the first surface and the second surface, and d) then joining the substrates together into approximate alignment of the first substrate with the second substrate to permit a field interaction between corresponding field-generating and field-detecting elements to act to complete alignment between the first substrate and the second substrate. After alignment is thus completed, the first substrate may then be sealed to the second substrate According to one preferred embodiment, the field-generating elements and the field detecting elements comprise a material having a high surface tension energy, such as solder. Desirably, such solder should have a melting point over 30 degrees Celsius, and preferably less than the setting temperature of the sealant used to seal the substrates (e.g. glass plates of an LCD) together after alignment is complete.

According to another embodiment, the field-generating elements comprise a permanently magnetic material and the field detecting elements comprise a magnetic material.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF PREFERRED EMBODIMENTS

Figure 1:
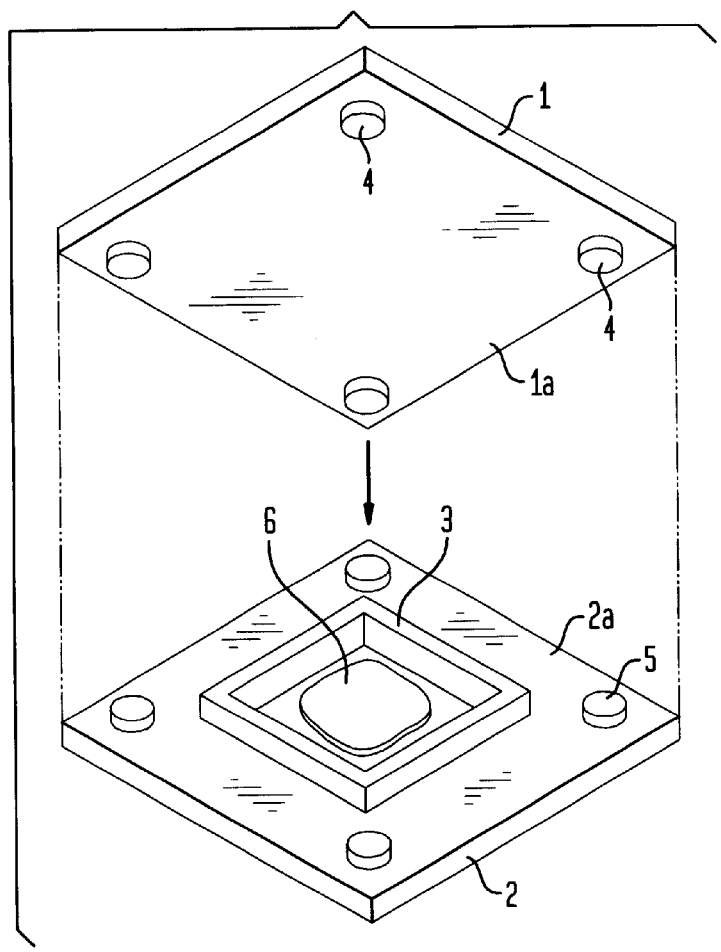
FIG. 1 is a schematic perspective view of the substrates and other elements used in the alignment method of the present invention.

FIG. 1 illustrates a method for aligning two substrates, such as liquid crystal plates 1, 2, to a precision required. The inventive method requires an approximate mechanical alignment followed by a self alignment process in which the natural forces are used to cause the two plates 1, 2 to be forced into precise alignment demanded by the tolerances of LCD's. The inventive method is intended to be used in a process of manufacturing LCD displays in a vacuum.

The approach to self alignment that is disclosed here, is to provide a gradient in energy such that the gradient is a minimum or close to a minimum at the correct alignment point. This will ensure that the plates 1, 2 stay aligned as the sealant 3 begins to hold them together permanently. Two exemplary methods are discussed as illustrative of invention. However, it will be understood that many variations are possible, which a person skilled in the art can readily adapt to achieve a desired degree of self-alignment for their particular needs.

Figure 2:
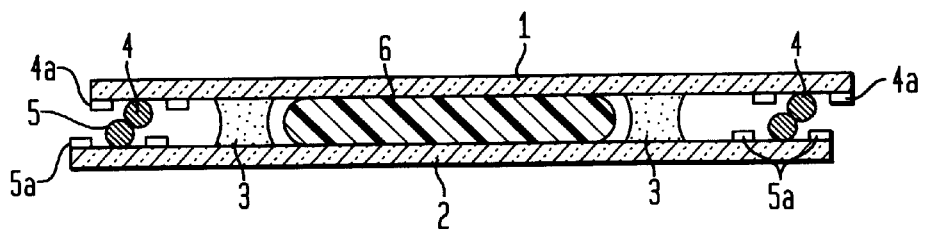
FIG. 2 is a schematic cross-sectional view of two substrates which have been juxtaposed in approximate alignment to one another in accordance with the present invention.

FIG. 1 shows a pair of substrates or plates 1, 2 which are to be brought into approximate alignment by placing them together as indicated by the arrow in FIG. 1 to achieve the approximate alignment illustrated in cross-section by FIG. 2. A number of field generating elements 4 are deposited upon a first surface 1a of substrate 1 and a number of field-detecting elements 5 are deposited upon a second surface 2a of substrate 2. The LC material 6 is shown surrounded by a sealant material 3, such as a thermosettable material, epoxy, or the like.

The first preferred embodiment of the invention is based upon a common observation that when two drops of a liquid are brought together, they will coalesce into one bigger drop. This is driven by the phenomena of surface tension. If the two liquids are immiscible then they may not coalesce. For the first embodiment, this principle is used to align the two plates 1, 2. On either plate, small dots 4, 5 (e.g. of the order of microns) of material such as solder that melts at a fairly low temperature (e.g. below 100 degrees Celsius) are placed using lithographic techniques. The solder dots 4, 5 are preferably surrounded by ridges or dams 4a, 5a, respectively to keep the solder dots in position Each dam preferably has a height that is less than half the desired distance between plates (which is determined by spacer beads of a diameter of perhaps 5 microns). The two plates 1, 2 are aligned mechanically approximately to each other such that pairs of solder two dots 4,5 on the two plates will contact one another, as shown in FIG. 2. Heat is then applied to cause the material in the dots 4,5 to melt and to then coalesce into one solder drop 7. In the process of coalescing into a single solder drop 7, the solder drops 4, 5 cause the plates 1, 2 to rotate and displace into the desired precise alignment. As will be understood, the two drops 4, 5 on the plates 1, 2 are anchored to their bases by mechanical dams 4a, 5a, respectively that surround them. Alternatively, drops 4, 5 may be anchored to plates 1, 2 by providing strong binding between the liquid drops 4,5 and the underlying material of plates 1, 2 on which they were deposited.

Figure 3:
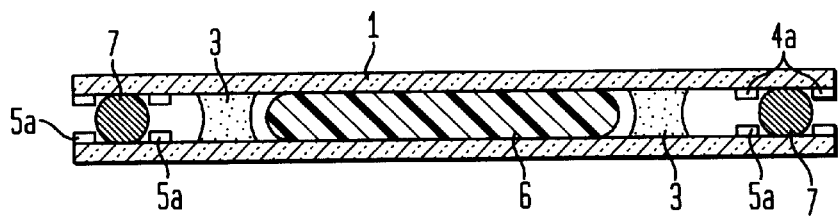
FIG. 3 is a schematic cross-sectional view of the two substrates of FIG. 2 depicting the completed alignment of the substrates in accordance with the invention.

According to an embodiment of the invention a method of aligning a pair of liquid crystal display substrates comprises the steps of: a) depositing a plurality of magnetic field-generating elements 4 at selected locations on a first surface 1a of a first substrate 1, b) depositing a plurality of magnetic field-detecting elements 5 at locations corresponding to the selected locations on a second surface 2a of a second substrate 2, c) joining the substrates together into approximate alignment (FIG. 2) of said first substrate 1 with said second substrate 2 to permit a field interaction between corresponding field-generating and field-detecting elements to complete alignment (as shown in FIG. 3) between said first substrate 1 and said second substrate 2 so that the first surface 1a faces the second surface 2a; and d) depositing a selected quantity of liquid crystal material 6 in a central region of either the first surface or the second surface. The substrates are aligned with each other such that a resulting alignment of the first substrate with respect to the second substrate completes a pixel and electrical contact between them to allow for liquid crystal display operation. The magnetic field-generating and magnetic field-detecting elements are located outside the central region. According to another embodiment, the field-generating elements comprise a permanently magnetic material and the field detecting elements comprise a magnetic material. Those skilled in the art will understand that the magnetic material of the field-detecting elements can also be a permanently magnetic material.

According to a second embodiment, the field-generating elements 4 and the field-detecting elements 5 may be composed of a magnetically permeable material such as iron. Thus, when the two magnetic dots 4, 5 are approximately aligned close together the application of an external magnetic field will generate an energy gradient so as to displace and rotate the two plates 1, 2 until the two dots 4, 5 align precisely. This magnetic gradient approach has the advantage of room temperature operation.

While the present invention has been described with reference to preferred embodiments in order to facilitate a better understanding of the invention, those skilled in the art will recognize that the invention can be embodied in various ways without departing from the scope and spirit of the invention as set forth in the appended claims.

What is claimed is:

1. A method of aligning a pair of liquid crystal display substrates such that a resulting alignment of a first substrate with respect to a second substrate completes a pixel and electrical contact between both substrates to allow for liquid crystal display operation, comprising the steps of:
   a) depositing a plurality of magnetic field-generating elements at selected locations on a first surface of a first substrate,
   b) depositing a plurality of magnetic field-detecting elements on a second surface of a second substrate at locations corresponding to said selected locations,
   c) joining the substrates together into approximate alignment of said first substrate with said second substrate to permit a field interaction between corresponding field-generating and field-detecting elements to complete alignment between said first substrate and said second substrate so that the first surface faces the second surface; and
   d) depositing a selected quantity of liquid crystal material in a central region of one of the first surface and the second surface,
   wherein the magnetic field-generating and magnetic field-detecting elements are located outside the central region.

2. A method of aligning a pair of substrates during assembly/fabrication of a liquid crystal display panel, said method comprising the steps of:
   a) depositing a plurality of magnetic field-generating elements at selected locations on a first surface of a first substrate,
   b) depositing a plurality of magnetic field-detecting elements on a second surface of a second substrate at locations corresponding to said selected locations,
   c) depositing a sealant around the outside border of a liquid crystal display area, d) joining the substrates together into approximate alignment of said first substrate with said second substrate to permit a field interaction between corresponding field-generating and field-detecting elements to complete alignment between said first substrate and said second substrate so that the first surface face the second surface; and wherein the magnetic field-generating and magnetic field-detecting elements are located outside the liquid crystal display area.

3. The method of claim 2, comprising a further step of:

e) then sealing the first surface to the second surface.

4. The method of claim 2, wherein:

step a) comprises depositing a plurality of magnetic field-generating elements, each comprising a permanently magnetic material, at selected locations on a first surface of a first substrate; and step b) comprises depositing a plurality of magnetic field-detecting elements comprising a magnetic material on a second surface of a second substrate at locations corresponding to said selected locations.

5. The method of claim 2, comprising a further step of applying heat to the sealant to cure or expand the sealant to permanently attach the two substrates together.

6. A method of aligning a pair of substrates during assembly of a liquid crystal display panel comprising the steps of, a) depositing a plurality of field-generating elements composed of a magnetically permeable material at selected locations on a first surface of a first substrate, b) depositing a plurality of magnetic field-detecting elements on a second surface of a second substrate at locations corresponding to said selected locations, c) joining the substrates together into approximate alignment of the first substrate with the second substrate, d) depositing a selected quantity of liquid crystal material in a central region of one of the first surface and the second surface, e) applying an external magnetic field to generate an energy gradient so as to displace and rotate the first and second substrates until the two substrates align precisely, wherein the magnetic field-generating and magnetic field-detecting elements are located outside the central region.

* * * * *